Figure 1:
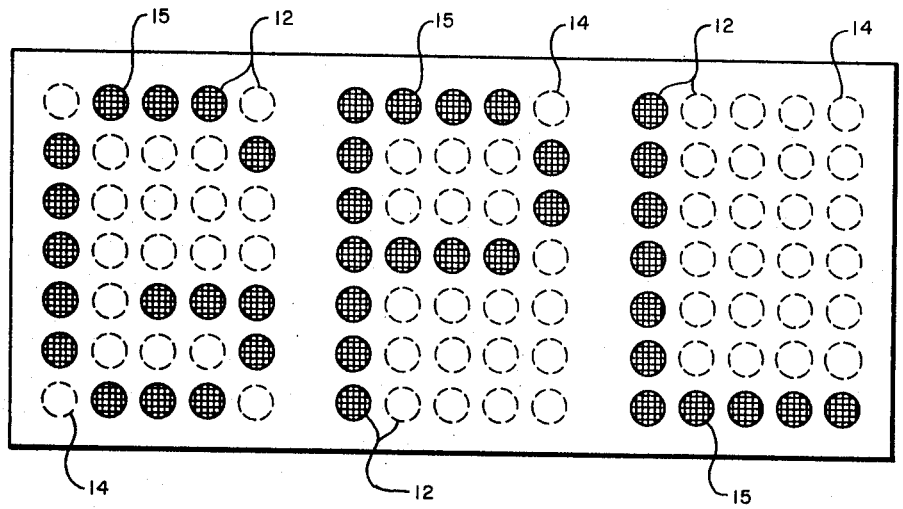

Aug. 16, 1966   J. P. McGUIRE ETAL   3,267,455
PULSE SCANNED REFLECTIVE DISPLAY
Filed Sept. 25, 1963   3 Sheets-Sheet 1

INVENTOR.
JOHN P. McGUIRE
JOHN K. McKENDRY
BY
ATTORNEY.

Aug. 16, 1966     J. P. McGUIRE ETAL     3,267,455
PULSE SCANNED REFLECTIVE DISPLAY

Filed Sept. 25, 1963     3 Sheets-Sheet 2

INVENTOR.
JOHN P. McGUIRE
JOHN K. McKENDRY
BY
*H. S. Mackey*
ATTORNEY.

INVENTOR.
JOHN P. McGUIRE
JOHN K. McKENDRY

United States Patent Office 3,267,455
Patented August 16, 1966

3,267,455
PULSE SCANNED REFLECTIVE DISPLAY
John P. McGuire, Briarcliff Manor, and John K. McKendry, Pleasantville, N.Y., assignors to General Precision, Inc., a corporation of Delaware
Filed Sept. 25, 1963, Ser. No. 314,574
5 Claims. (Cl. 340—324)

This invention relates to displays generally and more particularly to reflective displays which may be pulse scanned. Displays are very useful for disseminating alphanumeric information to large groups of individuals. However, where a lot of information is to be conveyed the time required to scan and set up large area displays is prohibitively long and prevents their use.

Typically prior art reflective displays employ a plurality of bistable elements arranged in a rectangular matrix and selectively operable means for placing each of said elements in one predetermined stable state to visually display the desired information.

These systems have at least one of two serious drawbacks. One, they are slow since each of the bistable elements requires a finite time to be set in serially scanned displays; or two, they are extremely complex where parallel scan is employed since separate conductors must be provided for each element.

One object of the invention is to provide a reflective display employing a plurality of bistable elements arranged in a matrix which may be rapidly arranged to display desired information.

Another object of the invention is to provide a reflective display employing a plurality of bistable elements arranged in a plurality of rows in which all the bistable elements in each row may be simultaneously set in any one preselected state.

A further object of the invention is to provide a large area reflective display comprising a plurality of bistable elements which may be rapidly changed from one display to another.

Yet another object of the invention is to provide a large area reflective display comprising a plurality of bistable elements which is easily and inexpensively manufactured.

The invention contemplates a large area reflective display comprising a plurality of bistable elements each capable of displaying one of two colors whereby the entire display may convey or display preselected information by arranging the individual elements according to a predetermined plan. The elements comprising the display are arranged in rows and all the elements in each said row are simultaneously translated to a ready position and then arranged according to the plan in response to external signals applied simultaneously to the corresponding elements in each of the rows. The rows may be arranged successively, randomly or in any predetermined manner.

The foregoing and other objects and advantages of the invention will become more apparent from a consideration of the drawings and specification wherein one embodiment of the invention is shown and described in detail for illustration purposes only.

Figure 2:
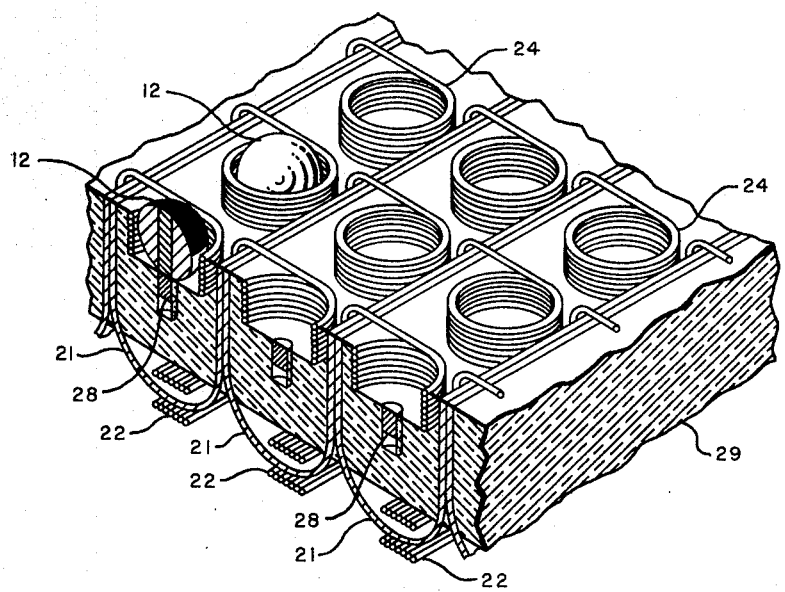
Figure 3:
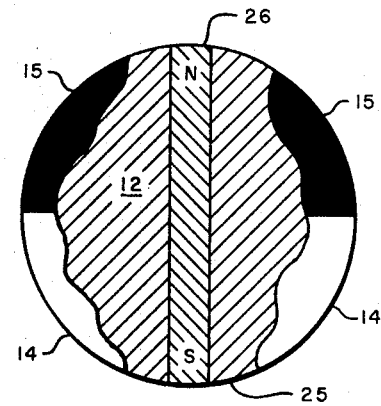
Figure 4:
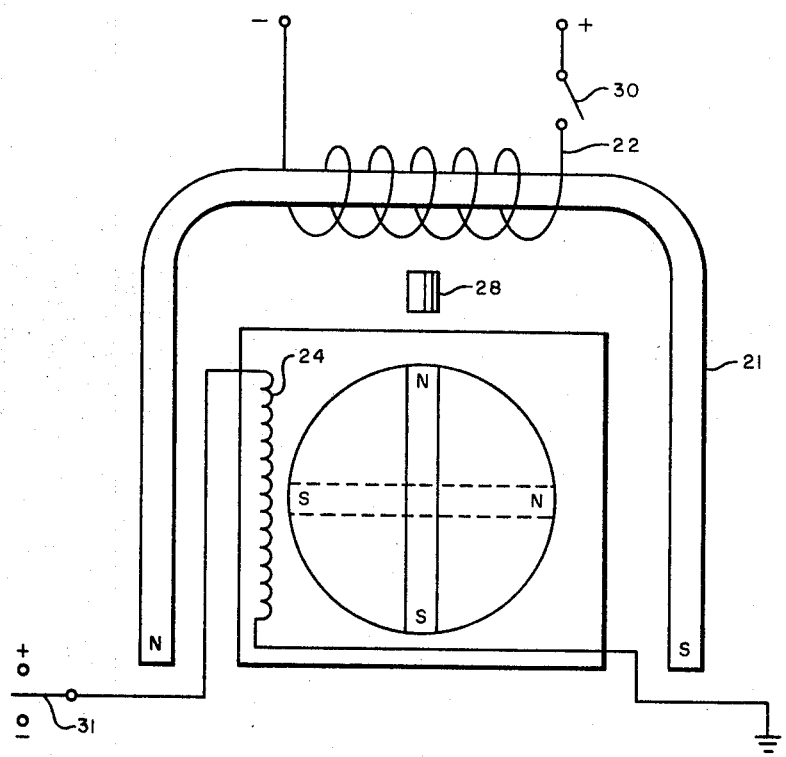
Figure 5:
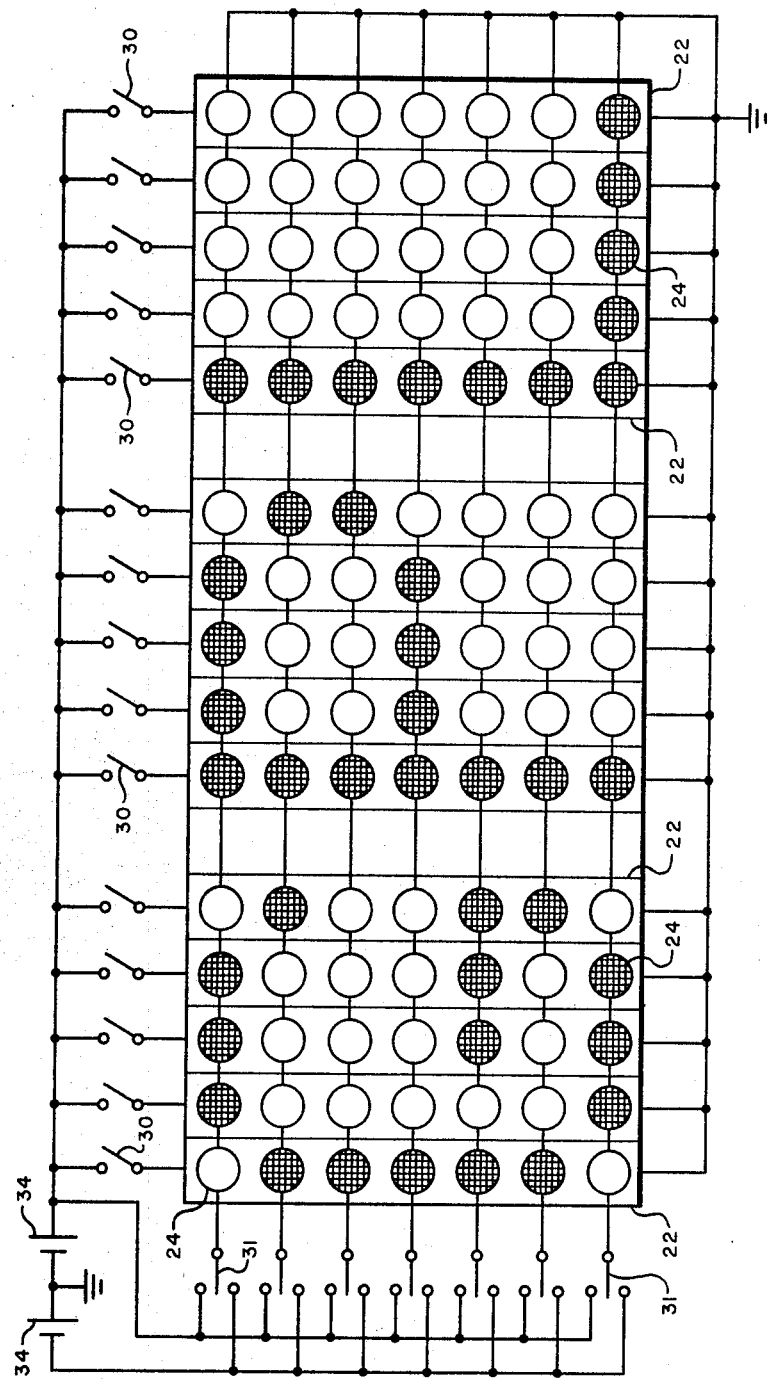

In the drawings:
FIGURE 1 is a plan view of a reflective display constructed in accordance with the invention;
FIGURE 2 is an isometric view of a portion of the display shown in FIGURE 1 with the covering surface removed to disclose the details of construction;
FIGURE 3 is a front elevation view of an individual display element partially in section;
FIGURE 4 is a schematic diagram illustrating the operation of the device for a single display element; and,
FIGURE 5 is a schematic wiring diagram of the reflective display illustrated in FIGURE 1.

In FIGURE 1 a three character display element 11 has three matrices each of which includes thirty-five spherical bistable display elements 12 arranged in a five by seven rectangular array. The elements 12 each have two stable states; in one, as illustrated at 14, the reflective qualities presented by the element are identical with the background. These elements are indicated by broken lines since they would not otherwise be distinguishable from the background. The other stable state is illustrated at 15 and provides reflective qualities which contrast with the background reflective qualities so that information can be displayed by selecting the appropriate reflective qualities for preselected elements 12.

Normally it is desirable to reverse the reflective qualities illustrated in FIGURE 1 since white elements on a black background are more readily distinguished. However, this arrangement does not lend itself to illustration since it requires large areas of black ink which renders proper execution of the drawings impossible or at best difficult.

In FIGURE 2 a plurality of U-shaped members 21, constructed of magnetic material are arranged in adjacent columns. These correspond to the columns shown in FIGURE 1 and contain within the U-shaped member 21 all of the elements 12, which in the illustrated embodiment is seven. Each U-shaped member 21 is provided with coil 22 around the bottom portion of the U and when energized, as will be described in detail later, provides a north and south pole on opposite sides of the U-shaped member for its entire length.

Each U-shaped member 21 has seven coils 24 within it, one for each element position. These coils are all wound in the same direction and corresponding coils in each column are connected in series. That is, the first coil in each of the columns is connected in a series circuit while the second coil in each of the columns is series connected in another circuit. Likewise the third, fourth, fifth, sixth and seventh coils in each of the columns are connected in separate series circuits. How these separate circuits of corresponding windings are energized will be described later in greater detail.

Coils 24 form wells within which the spherical elements 12 rest. The constructional details of elements 12 are illustrated in FIGURE 3. Each element has a spherical body portion 25 constructed of non-magnetic material and having one half coated with the reflective material 14 and the other half coated with the reflective material 15. A permanent magnet 26 passes through the center of the sphere and is normal to the plane separating the differently reflective hemispheres. The magnet 26 extends through to both surfaces; however, the surface portion is appropriately coated and is therefore not visible to the eye. The elements 12 may alternately be constructed of magnetic material and then magnetized and will perform the same function as described above.

A piece of magnetic material 28, such as soft iron, is fixedly positioned at the lower extremes of each coil and cooperates with the magnet 26 to provide two stable states. That is once the element 12 is positioned so that a north pole is adjacent magnetic member 28 it will remain in that position after the energizing currents, which will be described later, are removed. Therefore, the first stable state is with reflective surface 14 visible in which case the north pole of magnet 26 is adjacent member 28 and the second is with reflective surface 15 visible and the south pole of magnet 26 adjacent member 28.

The components shown in FIGURE 2, with the exception of the elements 12 may be assembled on a frame or jig to secure proper positioning and then encapsulated in plastic or other potting material 29 for structural support.

In addition a transparent cover, not shown, may be secured over the display, after elements 12 have been inserted, to prevent the entrance of dust, dirt or other foreign matter.

The operation of the device is best understood by consulting the schematic diagrams shown in FIGURES 4 and 5. In FIGURE 4 a schematic diagram of a single element is shown. The element 12 is illustrated in one of its stable states with the north pole of magnet 26 adjacent magnetic member 28.

If it is desired to change the display or otherwise revise it, winding 22 is connected to a source of direct current voltage by closing a switch 30. The current through winding 22 magnetizes U-shaped member 21 as indicated in FIGURE 4. The field associated with member 21 causes magnet 26 and element 12 to rotate to a transitional state illustrated in dotted line. Switch 30 must be closed long enough to cause movement to the transitional state and then it must be opened.

Once element 12 is in the transitional state it may be placed in either of its stable states by causing a current of one or another direction to pass through winding 24. If the field due to the current through winding 24 is directed toward member 28 the element 12 will be returned to the position illustrated. If, however, the field due to the current is directed away from element 28 the south pole will be moved adjacent member 28 by the field. A single-pole double-throw switch 31 has its armature connected to winding 24 and its contacts to positive and negative direct current voltage sources respectively. Thus, either stable state may be selected once the element has been moved to the transitional state by choosing the proper position for armature 31.

Normally it is best if switch 30 is opened before switch 31 is closed. However, a certain amount of overlap can be tolerated provided the element has reached the transitional state before current is applied to winding 24, and further that switch 30 is opened before switch 31.

The schematic diagram of FIGURE 5 is almost self-explanatory. Here a plurality of elements such as illustrated in FIGURE 4 are interconnected. Windings 22 are arranged in columns and each connected by a switch 30 to a direct current voltage source. The source includes two similar batteries 34 connected in series with the common connection grounded. The other end of each winding 22 is grounded to complete the circuit.

All the windings 24 in each horizontal row are connected in series. One end of the series circuit is grounded and the other is connected through switch 31 to the positive or negative potential available at series connected batteries 34.

When it is desired to revise the display the columns are pulsed in order and between column pulses the elements in the column being revised are arranged, by the proper closure of switches 31, as desired. All of the elements in a given column may be set at the same time which results in high speed operation of the device.

The column and row pulse inputs may be derived directly from a computer or special keyboard devices such as typewriters. However, such arrangements have not been disclosed since they are beyond the scope of this invention.

While only one embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:
1. A reflective display member comprising,
a displaceable element having oppositely disposed portions with different reflective characteristics and including a magnetized element having poles of opposite magnetic polarity each respectively positioned centrally of a respective different reflective portion,
a fixed magnetic member positioned contiguous to said displaceable element,
said fixed magnetic member coacting with one of the poles of said magnetized element for maintaining said displaceable element in a first stable state wherein one reflective characteristic is visible and coacting with the other pole of said magnetized element for maintaining said displaceable element in a second stable state wherein only the other reflective characteristic is visible,
first selectively operable means for establishing a first unidirectional magnetic field to interact with the magnetic field of said magnetized element to cause said displaceable element to be displaced to a transient position intermediate to said first and second states wherein neither of the poles of said magnetized element is closely adjacent to said fixed magnetic member, and
second selectively operable means for establishing a second unidirectional magnetic field to interact with the field of said magnetized element to displace said displaceable element to one or the other of its stable states wherein one or the other of the poles of said magnetized element is closely adjacent said fixed magnetic member.

2. A reflective display comprising,
a plurality of displaceable elements each having oppositely disposed portions with different reflective characteristics,
each displaceable element including a magnetized element having poles of opposite magnetic polarity, each pole being respectively positioned centrally of a respective different reflective portion,
a plurality of fixed magnetic members each of which is positioned contiguous to respective ones of said displaceable elements and their associated magnetized elements,
said displaceable elements and their respective contiguous fixed magnetic members being arranged in a plurality of rows with a number of displaceable elements and contiguous fixed magnetic members in each of said rows,
each fixed magnetic member coacting with one pole of the magnetized element included in the respective displaceable element to which it is contiguous for maintaining the displaceable element in a first stable state wherein only one reflective characteristic is visible and coacting with the other poles of the magnetized element included in a respective displaceable element for maintaining the respective displaceable element in a second stable state wherein only the other reflective characteristic is visible,
first selectively operable means for establishing a first unidirectional magnetic field common to all the magnetized elements in any selected row to interact with the individual magnetic fields of the magnetized elements to cause the respective displaceable elements with which they are associated to be displaced to a transient position intermediate said first and second states wherein neither of the poles of said magnetized elements is closely adjacent an associated fixed magnetic member,
second selectively operable means for establishing a second unidirectional magnetic field common to only one selected magnetized element in each of the rows to interact with that magnetized element whose associated displaceable element is in its transient position to displace said displaceable element to one or the other of its stable states wherein one or the other of the poles of said magnetized element is closely adjacent its associated fixed magnetic member.

3. A reflective display comprising,
a plurality of displaceable elements each having oppositely disposed portions with different reflective characteristics, each displaceable element including a magnetized element having poles of opposite magnetic polarity, each pole being respectively positioned centrally of a respective different reflective portion, a plurality of fixed magnetic members each of which is positioned contiguous to respective ones of said displaceable elements and their associated magnetized elements, said displaceable elements and their respective contiguous fixed magnetic members being arranged in a plurality of rows with a number of displaceable elements and contiguous fixed magnetic members in each of said rows, each fixed magnetic member coacting with one pole of the magnetized element included in the respective displaceable element to which said fixed magnetic member is contiguous for maintaining the displaceable element in a first stable state wherein only one reflective characteristic is visible and coacting with the other pole of the magnetized element included in a respective displaceable element for maintaining the respective displaceable element in a second stable state wherein only the other reflective characteristic is visible, a plurality of first selectively operable means each associated with one of said rows for selectively establishing in its row a first unidirectional magnetic field common to all of the magnetized elements in the row to interact with the individual magnetic fields of the magnetized elements to cause the respective displaceable elements with which they are associated to be displaced to a transient position intermediate to said first and second states wherein neither of the poles of said magnetized element is closely adjacent its associated fixed magnetic member, a plurality of second selectively operable means each respectively associated with each of respective ones of said magnetized elements in the rows for establishing a second unidirectional magnetic field to interact with the magnetic field of respective ones of said magnetized elements to displace the displaceable elements in which they are included from their transient positions to one or the other of its stable states wherein one or the other of the poles of said magnetized element is closely adjacent its associated fixed magnetic member.

4. A reflective display comprising, a plurality of displaceable elements each having two portions with different reflective characteristics and being permanently magnetized to provide magnetic poles of opposite magnetic polarity one pole being centrally positioned with respect to one portion and the other pole being centrally located with respect to the other portion, a plurality of fixed magnetic members each of which is positioned contiguous to respective ones of said displaceable elements, all said displaceable elements and their associated fixed magnetic members being arranged in a rectangular matrix comprising orthogonally intersecting columns and rows of displaceable elements, each of said fixed magnetic members coacting with one of the poles of its contiguous displaceable element when adjacent said one pole for maintaining said displaceable element in a first stable state wherein only one reflective characteristic is visible, and coacting with the other pole of said displaceable element when adjacent said other pole for maintaining said displaceable element in a second stable state wherein only the other reflective characteristic is visible, first selectively operable means for establishing a first unidirectional magnetic field common to all of the displaceable elements in any selected column interacting with the permanently magnetized fields thereof to cause said poles to be equally displaced from positions adjacent said fixed magnetic member to move said displaceable element to a transient position intermediate said first and second stable states, and second selectively operable means for establishing a second unidirectional magnetic field common to all of the displaceable elements in a row which are in a transient position to move said displaceable elements to a selected one of their stable states so that one or the other of their poles lies closely adjacent an associated fixed magnetic member.

5. A reflective display comprising, a plurality of displaceable elements each having two portions with different reflective characteristics and being permanently magnetized to provide magnetic poles of opposite magnetic polarity one pole being centrally positioned with respect to one portion and the other pole being centrally located with respect to the other portion, a plurality of fixed magnetic members each of which is positioned contiguous to respective ones of said displaceable elements, all said displaceable elements and their associated fixed magnetic members being arranged in a rectangular matrix comprising orthogonally intersecting columns and rows of displaceable elements, each of said field magnetic members coacting with one of the poles of its contiguous displaceable element when adjacent said one pole for maintaining said displaceable element in a first stable state wherein only one reflective characteristic is visible, and coacting with the other pole of said displaceable element when adjacent said other pole for maintaining said displaceable element in a second stable state wherein only the other reflective characteristic is visible, a plurality of first selectively operable means each associated with one of said columns for selectively establishing in its column a first unidirectional magnetic field common to all of the displaceable elements in the column to interest with the permanently magnetized field thereof to cause said poles to be equally displaced from positions adjacent said fixed magnetic member to move said displaceable element to a transient position intermediate said first and second stable states, and a plurality of second selectively operable means each associated with all of the elements in a row for selectively establishing a second unidirectional magnetic field common to all of the displaceable elements in a row which are in a transient position to move said displaceable elements to a selected one of their stable states so that one or the other of their poles lies closely adjacent an associated fixed magnetic member.

References Cited by the Examiner
UNITED STATES PATENTS

| 3,036,300 | 5/1962 | Knight | 340—373 |
|---|---|---|---|
| 3,042,823 | 7/1962 | Willard | 313—6 |
| 3,140,553 | 7/1964 | Taylor | 40—28 |

NEIL C. READ, *Primary Examiner.*

A. J. KASPER, *Assistant Examiner.*